US012734869B2

(12) United States Patent
Lawrence

(10) Patent No.: US 12,734,869 B2
(45) Date of Patent: Sep. 15, 2026

(54) ASSEMBLY CONFIGURED TO COVER OPENINGS IN MOTOR VEHICLE DURING WASHING

(71) Applicant: Matthew Quinten Lawrence, Livonia, MI (US)

(72) Inventor: Matthew Quinten Lawrence, Livonia, MI (US)

(73) Assignee: Matthew Quinten Lawrence, Livonia, MI (US)

( * ) Notice: Subject to any disclaimer, the term of this patent is extended or adjusted under 35 U.S.C. 154(b) by 228 days.

(21) Appl. No.: 18/111,627

(22) Filed: Feb. 20, 2023

(65) Prior Publication Data

US 2023/0264551 A1 Aug. 24, 2023

Related U.S. Application Data

(60) Provisional application No. 63/313,497, filed on Feb. 24, 2022.

(51) Int. Cl.
*B60J 11/06* (2006.01)
*B62D 25/24* (2006.01)

(52) U.S. Cl.
CPC ............... *B60J 11/06* (2013.01); *B62D 25/24* (2013.01)

(58) Field of Classification Search
CPC .......... B62D 25/24; B62D 25/12; B60J 11/06; B60J 10/26; B60H 1/30; B65D 51/1694; B65D 2543/00953
USPC .................................... D7/629, 360; D9/443
See application file for complete search history.

(56) References Cited

U.S. PATENT DOCUMENTS 1,984,077 A * 12/1934 Morrison ................ E05C 19/06 49/386
5,275,249 A * 1/1994 Nelson ................... B62D 25/12 180/69.2
7,226,119 B1 * 6/2007 Weaver .................... B60H 1/26 296/180.1

(Continued)

FOREIGN PATENT DOCUMENTS

CN 101940434 A * 1/2011
FR 2836427 A1 * 8/2003 ............. B60K 15/05

OTHER PUBLICATIONS

Don Jorgenson; midenginecorvetteforum.com; accessed Dec. 18, 2024; published Mar. 22, 2020; https://www.midenginecorvetteforum.com/forum/mid-engine-corvettes/c8-diys-mods-aa/129245-early-c8-drivi (Year: 2020).*

(Continued)

*Primary Examiner* — Daniel J Colilla
(74) *Attorney, Agent, or Firm* — Carlson, Gaskey & Olds, P.C.

(57) ABSTRACT

This disclosure relates to an assembly configured to cover openings in a motor vehicle during washing of the motor vehicle. Among other benefits, which will be appreciated from the below description, the assembly of this disclosure allows one to wash their motor vehicle without soap, or soapy water, entering an engine compartment of the motor vehicle via the openings. As such, the soap or soapy water does not leave residue on the engine that may require additional washing, for example. Further, the disclosed assembly is relatively easy to install and remove relative to the motor vehicle, while also providing a sturdy and reliable seal relative to the motor vehicle.

20 Claims, 4 Drawing Sheets

(56) References Cited

U.S. PATENT DOCUMENTS

| | | | | |
|---|---|---|---|---|
| 9,776,579 | B1 * | 10/2017 | Delaney | B60R 13/07 |
| 2011/0284545 | A1 * | 11/2011 | Lundgreen | B65D 43/021 220/377 |
| 2021/0101742 | A1 * | 4/2021 | Altadonna, Jr. | B65D 43/0202 |
| 2021/0269100 | A1 * | 9/2021 | Mininger, III | B62D 25/12 |
| 2021/0402870 | A1 * | 12/2021 | Moradnia | B60K 11/04 |
| 2022/0355869 | A1 | 11/2022 | Burhans | |

OTHER PUBLICATIONS

2020colorado; Mid Engine Corvette Forum; https://www.midenginecorvetteforum.com/forum/mid-engine-corvettes/c8-mods-planned/195822-diy-covers-for-c8-rear-hatch-mesh-openings; accessed Sep. 30, 2025; published Oct. 4, 2020. (Year: 2020).*

Strake; Mid Engine Corvette Forum; https://www.midenginecorvetteforum.com/forum/mid-engine-corvettes/c8-mods-planned/196100-our-solution-to-the-engine-compartment-washing-problem, accessed on Sep. 29, 2025; published Oct. 14, 2020. (Year: 2020).*

Ganssauge, J.-L. (Dec. 18, 2022). Washing a car with a vented hood: What to consider. ShinyCarProject. Retrieved Feb. 20, 2023, from https://shinycarproject.com/washing-a-car-with-a-vented-hood-what-to-consider/.

* cited by examiner

ASSEMBLY CONFIGURED TO COVER OPENINGS IN MOTOR VEHICLE DURING WASHING

RELATED APPLICATION(S)

This application claims the benefit of U.S. Provisional Application No. 63/313,497, filed Feb. 24, 2022, the entirety of which is herein incorporated by reference.

TECHNICAL FIELD

This disclosure relates to an assembly configured to cover openings in a motor vehicle during washing of the motor vehicle.

BACKGROUND

The exterior of a motor vehicle includes various panels, such as body panels and glass panels, that separate the passenger cabin and the engine compartment, among other things, from the outside environment. The exterior also includes a plurality of openings permitting ingress and egress of fluids, such as air, relative to the passenger cabin or the engine compartment. Some vehicles, such as higher performance vehicles, include hood openings, such as hood vents or hood scoops, configured to either extract air from the engine compartment or to draw air into the engine compartment, respectively.

SUMMARY

In some aspects, the techniques described herein relate to an assembly, including: a cover configured to fit relative to an opening of a motor vehicle, wherein the opening is able to communicate fluid to an engine of the motor vehicle, and wherein the cover is configured to prevent fluid from entering the opening.

In some aspects, the techniques described herein relate to an assembly, wherein the cover is formed as a single, integrated body without any joints or seams.

In some aspects, the techniques described herein relate to an assembly, wherein the cover is formed without any holes that would communicate fluid from an outside location into the opening.

In some aspects, the techniques described herein relate to an assembly, wherein the cover is formed of a rubber material.

In some aspects, the techniques described herein relate to an assembly, wherein the cover is formed using a molding technique.

In some aspects, the techniques described herein relate to an assembly, wherein the cover includes a perimeter, and wherein the perimeter includes an edge having a flared bottom portion.

In some aspects, the techniques described herein relate to an assembly, wherein: the cover includes a main body, the main body exhibits a variable height between a front edge and a rear edge of the main body, and the height of the cover is at a maximum at a point between the front edge and the rear edge.

In some aspects, the techniques described herein relate to an assembly, wherein the cover includes a tab projecting from the main body.

In some aspects, the techniques described herein relate to an assembly, wherein: the cover is a first cover and the opening is a first opening, the assembly further includes a second cover configured to fit relative to a second opening of the motor vehicle, and the second opening is able to communicate fluid to the engine of the motor vehicle.

In some aspects, the techniques described herein relate to an assembly, wherein the first cover and the second cover are substantially mirror images of one another.

In some aspects, the techniques described herein relate to an assembly, further including: a third cover configured to fit relative to a third opening of the motor vehicle, wherein the third opening is able to communicate fluid to the engine of the motor vehicle.

In some aspects, the techniques described herein relate to an assembly, wherein the third cover is sized and shaped substantially differently relative to the first cover and second cover.

In some aspects, the techniques described herein relate to an assembly, wherein: the first and second covers are configured to fit relative to the first and second openings by movement in a vertical direction, and the third cover is configured to fit relative to the third opening by movement in a direction parallel to a centerline of the motor vehicle.

In some aspects, the techniques described herein relate to an assembly, wherein the motor vehicle is a mid-engine vehicle.

In some aspects, the techniques described herein relate to a method, including: covering an opening of a motor vehicle with a cover before washing the motor vehicle, wherein the opening is able to communicate fluid into an engine of the motor vehicle, and wherein the cover is configured to prevent fluid from entering the opening from an outside location.

In some aspects, the techniques described herein relate to a method, further including: washing the motor vehicle after the covering step.

In some aspects, the techniques described herein relate to a method, wherein: the cover is a first cover and the opening is a first opening, and the method further includes covering a second opening of the motor vehicle with a second cover, wherein the second opening is able to communicate fluid to the engine.

In some aspects, the techniques described herein relate to a method, wherein the first cover and the second cover are substantially mirror images of one another.

In some aspects, the techniques described herein relate to a method, further including: covering a third opening of the motor vehicle with a third cover, wherein the third opening is able to communicate fluid to the engine.

In some aspects, the techniques described herein relate to a method, wherein: the steps of covering the first and second openings includes moving the first and second covers in a vertical direction, and the step of covering the third opening includes moving the third cover in a direction parallel to a centerline of the motor vehicle.

DETAILED DESCRIPTION

This disclosure relates to an assembly configured to cover openings in a motor vehicle during washing of the motor vehicle. Among other benefits, which will be appreciated from the below description, the assembly of this disclosure allows one to wash their motor vehicle without water, soap, or soapy water, entering an engine compartment of the motor vehicle via the openings. As such, the water, soap, or soapy water does not leave residue on the engine that may require additional washing, for example. Further, the disclosed assembly is relatively easy to install and remove relative to the motor vehicle, while also providing a sturdy and reliable seal relative to the motor vehicle.

Figure 1:
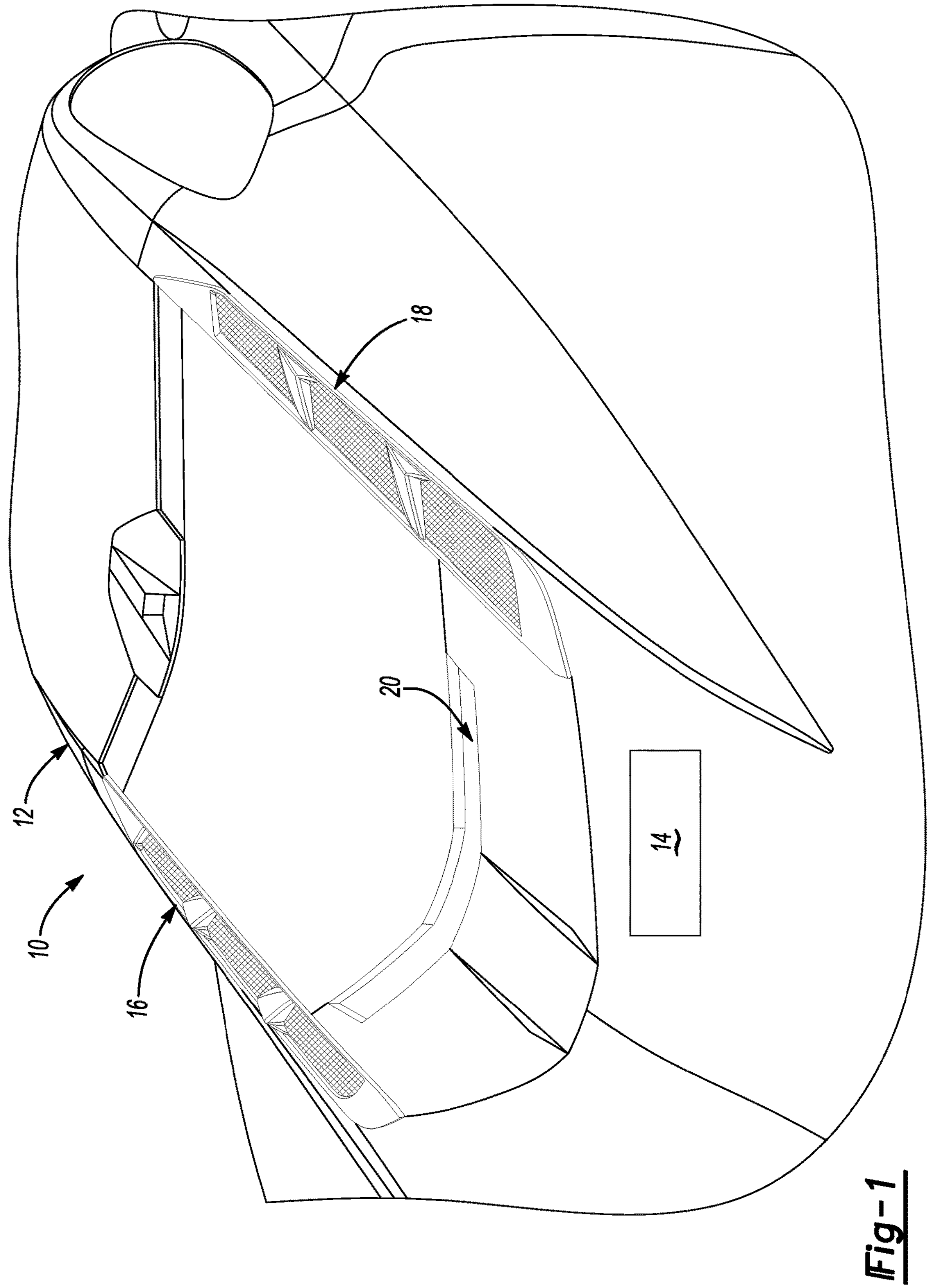
FIG. 1 illustrates a portion of an example motor vehicle from a rear perspective.

FIG. 1 illustrates a portion of an example motor vehicle 10 from a rear perspective. The motor vehicle 10 includes an exterior 12 including a plurality of glass panels and body panels. In this example, the motor vehicle 10 is a relatively high performance vehicle. Specifically, the motor vehicle 10 is a sports car. This disclosure extends to vehicles other than sports cars and relatively high performance vehicles, however. The teachings of this disclosure are applicable to other vehicle types, including sedans, trucks, vans, sport utility vehicles (SUVs), utility terrain vehicles (UTVs), etc.

The motor vehicle 10 is a mid-engine vehicle, which is a vehicle in which the engine is mounted in front of the rear-wheel axles and behind the front axle. The engine 14 is represented schematically in FIG. 1. While a mid-engine vehicle is described and shown, this disclosure extends to vehicles with other engine layouts.

The exterior 12 includes a plurality of openings permitting fluid, such as air, to flow relative to the engine 14. In this example, the exterior 12 includes first and second longitudinally-extending vents 16, 18 and a central vent 20. The vents 16, 18, 20 are configured to communicate fluid between the engine 14 and a location outside the vehicle 10.

The vents 16, 18 exhibit a length dimension oriented substantially parallel to a centerline of the motor vehicle 10, whereas the vent 20 exhibits a length dimension substantially perpendicular to the centerline of the motor vehicle 10. Here, the vent 20 is between the vents 16, 18. While the motor vehicle 10 includes vents 16, 18, 20, this disclosure extends to motor vehicles having a different arrangement of openings, including different vent arrangements.

Figure 2:
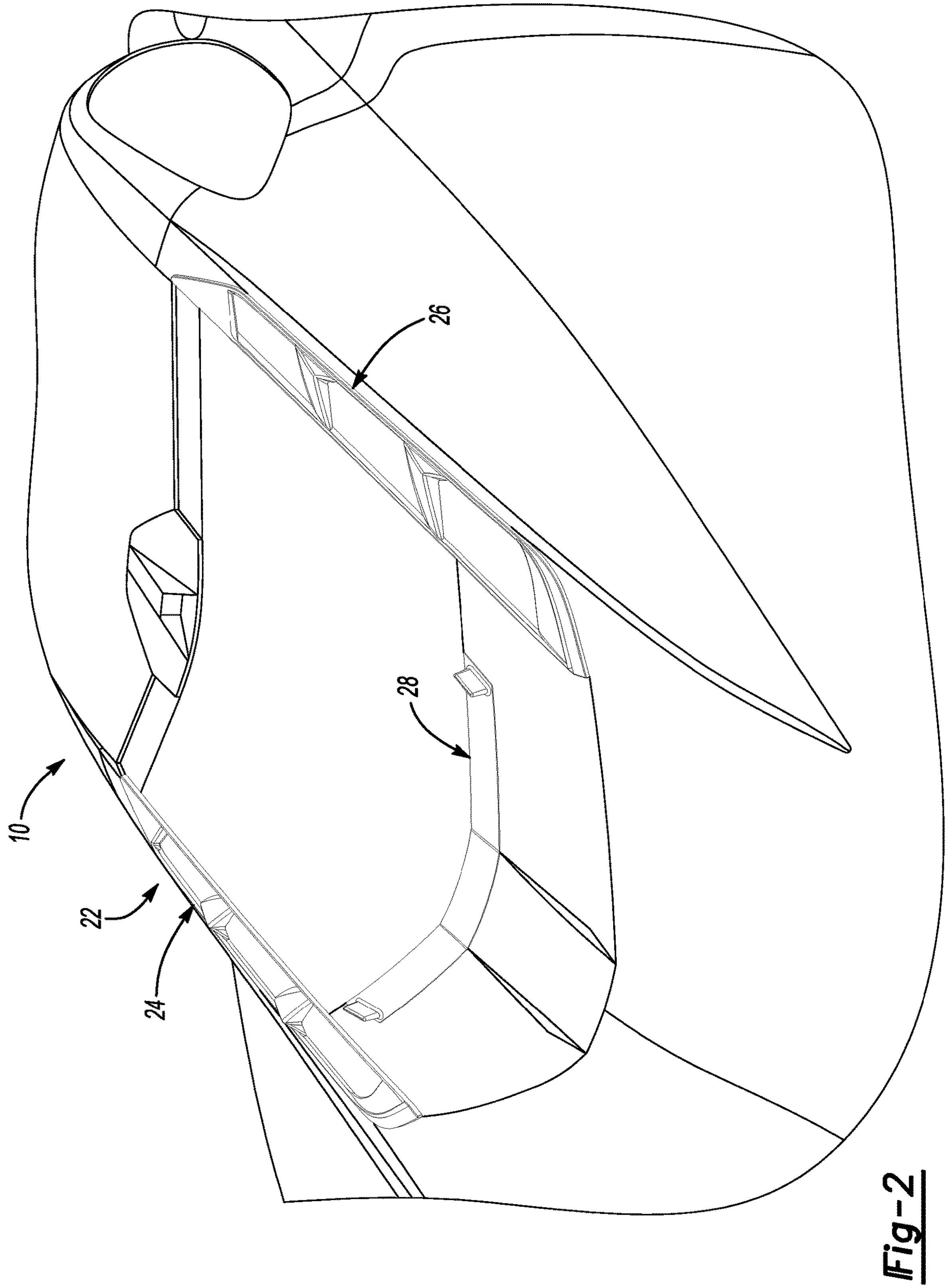
FIG. 2 illustrates an example assembly of covers, each of which is covering a respective opening of the motor vehicle.

FIG. 2 illustrates an example assembly 22 configured to cover the vents 16, 18, 20. In this example, the assembly 22 includes a first longitudinally-extending cover 24, a second longitudinally-extending cover 26, and a central cover 28.

The covers 24, 26, 28 are each formed as single, integrated structures without any gaps or seams. The covers 24, 26, 28 are formed of a rubber material in one example. The covers 24, 26, 28 are formed of a relatively sturdy rubber, in one particular example, such that the covers 24, 26, 28 are resistant to wear and can be reused. The covers 24, 26, 28 may be formed using a molding technique.

The covers 24, 26, 28 are configured to fit relative to vents 16, 18, 20, respectively, so as to establish seals and prevent ingress of fluid into the engine 14 via the vents 16, 18, 20. In particular, the covers 24, 26, 28 are configured to prevent the ingress of water, soap, wax, soapy water, etc., during washing of the motor vehicle 10. In this way, such fluids are prevented from reaching the engine 14, which preserves the appearance of the engine 14. Specifically, the covers 24, 26, 28 prevent stains, including water marks, soap stains, and/or rust from forming on the engine 14, which otherwise may have formed if the covers 24, 26, 28 were not used during washing of the motor vehicle 10. At a minimum, the covers 24, 26, 28 reduce the time a user, such as a car detailer, has to spend cleaning or drying the engine 14 after washing the exterior 12. The covers 24, 26, 28 also reduce the time the user has to spend preparing the exterior 12 for washing.

The cover 26 will now be described in detail with reference to FIGS. 3 and 4. First, however, it should be noted that the cover 24 is a substantially identical mirror image of cover 26. The below explanation of the structure and function of cover 26 applies equally to cover 24.

Figure 3:
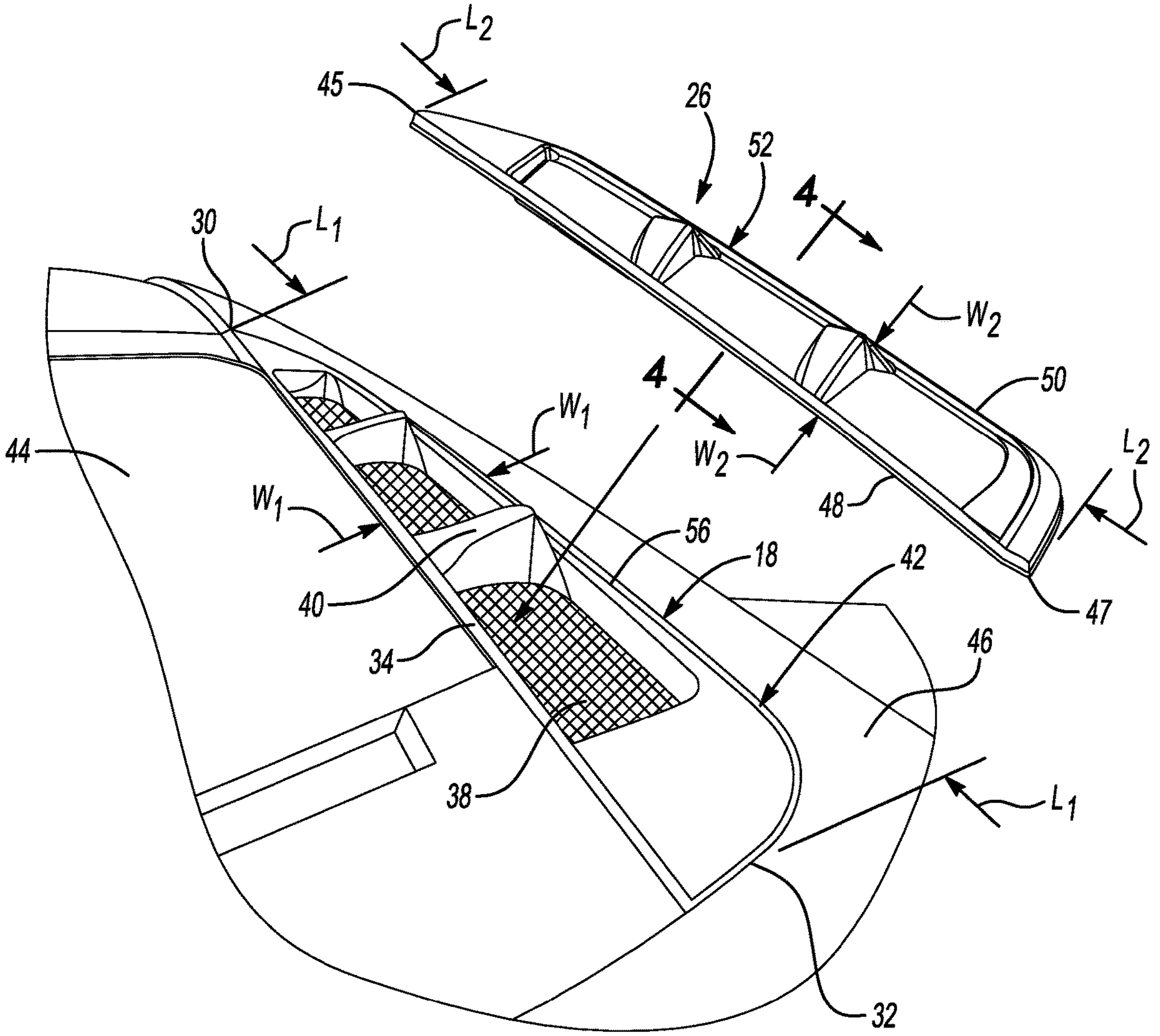
FIG. 3 illustrates one example type of cover relative to an opening of the motor vehicle.

FIG. 3 is an exploded view, and shows the cover 26 relative to vent 18. The cover 26 is configured to fit relative to the vent 18 by being placed onto the vent 18 from the top, as generally shown in FIG. 3, and by moving vertically downward relative to the vent 18.

The vent 18 includes a length $L_1$ between a front edge 30 and a rear edge 32, and a width $W_1$ between an inside edge 34 and an outside edge 36. Along the length $L_1$, the vent 18 includes a plurality of openings 38 configured to communicate fluid relative to the engine 14 and a plurality of projections 40. The width $W_1$ gradually increases moving from the front edge 30 to the rear edge 32, in this example.

A perimeter gap 42 circumscribes at least most of the vent 18, and here circumscribes substantially the entire vent 18. Specifically, the perimeter gap 42 is present along substantially the entire length of both edges 34, 36. Adjacent the edge 34, the perimeter gap 42 is present between the vent 18 and a rear glass panel 44. The perimeter gap 42 is also present between the edges 32, 36 and body panel 46.

The cover 26 includes a body sized and shaped similar to the vent 18. Specifically, the cover 26 is configured to rest on top of the vent 18 in a manner that prevents fluid from flowing into openings 38. The cover 26 is further configured to interface with the perimeter gap 42.

The cover 26 includes a length $L_2$ between a front edge 45 and a rear edge 47, and a width $W_2$ between an inside edge 48 and an outside edge 50. Along the length $L_2$, the cover 26 is a solid body without any holes that would communicate fluid from an outside location into the openings 38. The cover 26 includes an outer perimeter 52 configured to interface with the perimeter gap 42. Specifically, the cover 26 includes features located adjacent the outer perimeter 52 that are configured to fit into the perimeter gap 42 in a manner that holds the cover 26 in place relative to the vent 18 and establishes a seal preventing ingress of fluids relative to the openings 38.

Figure 4:
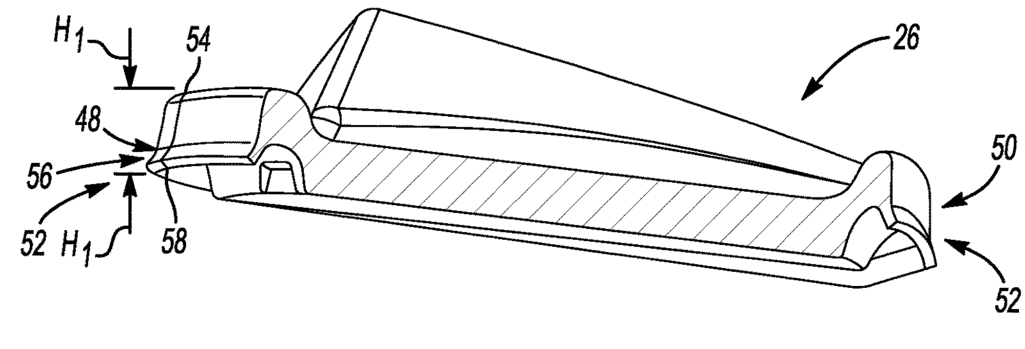
FIG. 4 is a cross-sectional view of the cover of FIG. 3 taken along line 4-4 from FIG. 3.

FIG. 4 illustrates an example configuration of the perimeter 52. With reference to the perimeter 52 adjacent edge 48, the edge 48 exhibits a height $H_1$. Moving from a top 54 of the edge 48 down, the edge 48 is substantially flat with the exception of a flared bottom portion 56, which is present along only a portion of the overall height $H_1$ adjacent the bottom 58 of the edge 48. The flared bottom portion 56 is a portion of the edge 48 that projects gradually further outward from the remainder of the edge 48 until the flared bottom portion 56 reaches the bottom 58. The flared bottom portion 56 lies in a plane non-parallel to a remainder of the edge 48. The flared bottom portion 56 is configured for insertion into the perimeter gap 42 and can engage the rear glass panel 44, for example, to create an interference fit, which is configured to hold the cover 26 in place during washing, and to establish a seal that prevents fluid from entering into the openings 38. When in the perimeter gap 52, the flared bottom portion 56 deflects relative to its resting position, shown in FIG. 4, which establishes the interference fit and seal. The edge 50, and the edges 45, 47, of the cover 26 are configured similarly and are configured to engage the body panel 46 and/or other structures adjacent the perimeter gap 42 in a similar manner.

Figure 5:
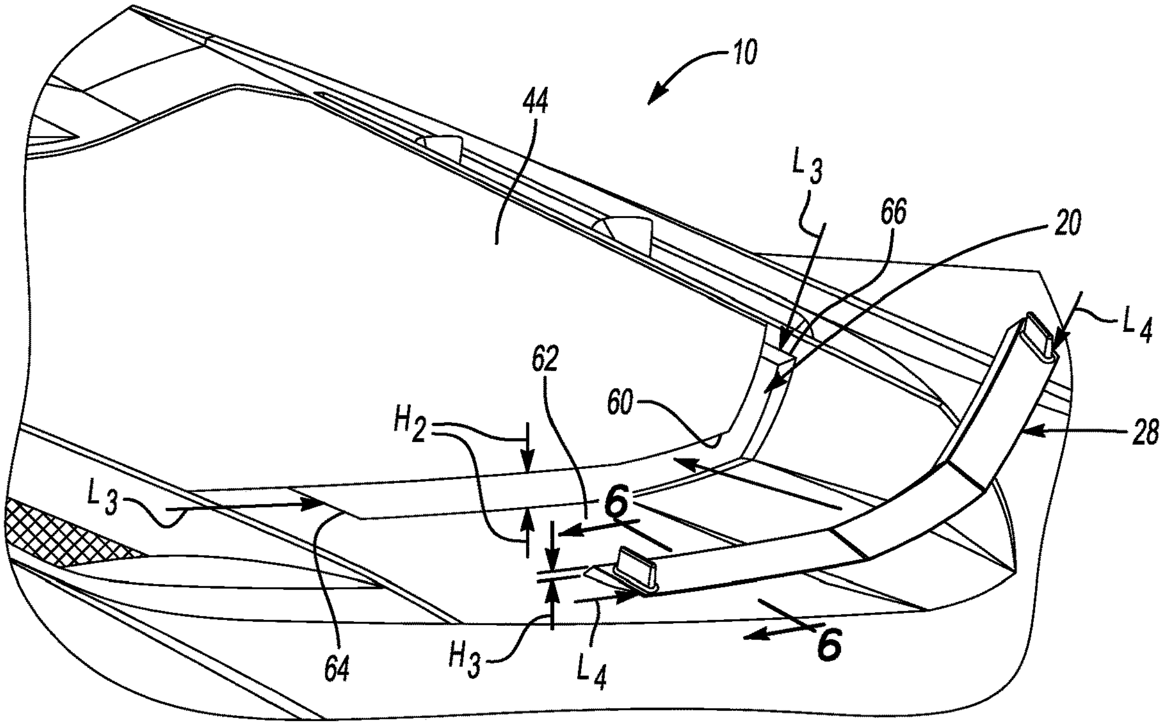
FIG. 5 illustrates another example type of cover relative to an opening of the motor vehicle.

FIG. 5 is an exploded view, and shows the cover 28 relative to vent 20. The cover 28 is sized and shaped substantially differently relative to covers 24, 26. The vent 20 is an opening in the motor vehicle 10 between a rear edge 60 of the rear glass panel 44 and an adjacent body panel 62. Fluid entering the vent 20 can flow to the engine 14.

The body panel 62 is spaced vertically downward relative to the rear edge 60. The vent 20 exhibits a length $L_3$ between a first side 64 and a second side 66, and a height $H_2$ between the rear edge 60 and the body panel 62. The length $L_3$ is substantially perpendicular to the centerline of the motor vehicle 10.

The cover 28 is sized and shaped to fit into the vent 20 by insertion into the vent 20 from the rear, as generally shown in FIG. 5. Specifically, the cover 28 is inserted into the vent by movement in a forward direction substantially parallel to the centerline of the motor vehicle 10. In this example, the cover 28 is sized and shaped to substantially fill the vent 20 to prevent ingress of fluid into the vent 20. The cover 28 exhibits a length $L_4$ and a height $H_3$ substantially corresponding to the length $L_3$ and height $H_2$. The cover 28 is solid body without any holes that would communicate fluid from an outside location into the vent 20.

Figure 6:
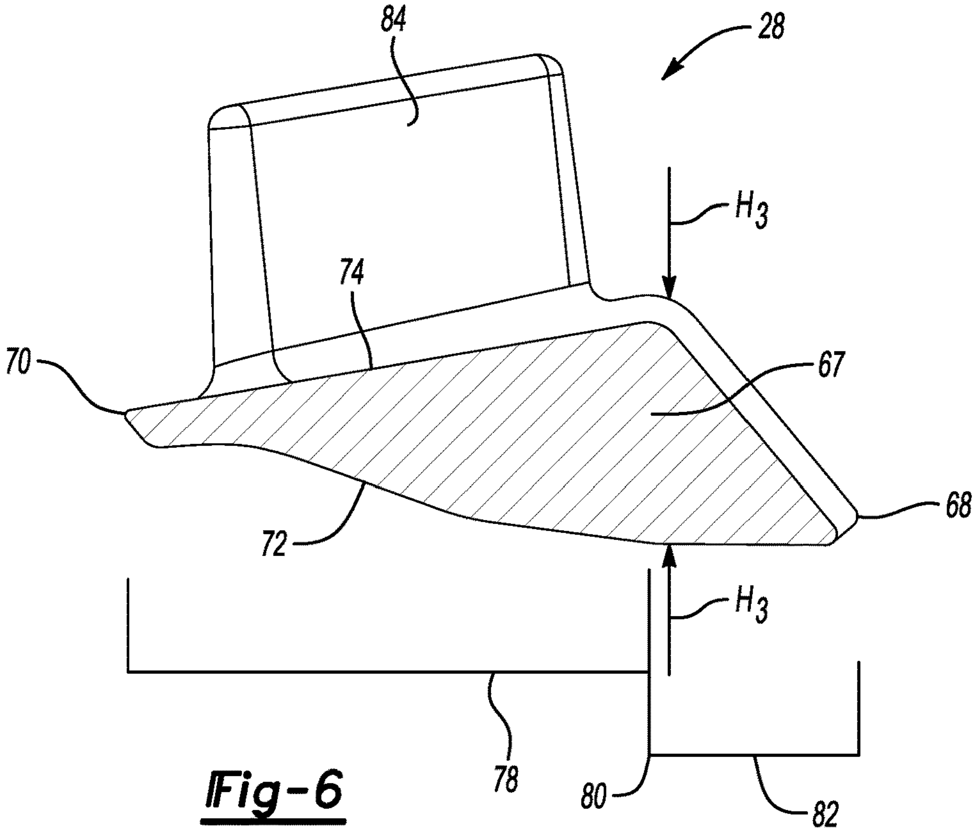
FIG. 6 is a cross-sectional view of the cover of FIG. 5 taken along line 6-6 from FIG. 5.

With reference to FIG. 6, the cover 28 includes a main body portion 67 with a front edge 68, a rear edge 70, a bottom surface 72, and a top surface 74. The height $H_3$ is a height of the main body portion 67. The height $H_3$ gradually increases moving along a first section 78 of the main body portion 67, beginning at the rear edge 70 and ending at a point 80 between the front and rear edges 68, 70. The height $H_3$ then gradually decreases moving from point 80 to front edge 68 along a second section 82 of the main body portion 67. The first and second sections 78, 82 are width sections of the cover 28. Height $H_3$ is at a maximum at point 80 in this example. The point 80 is not a central point along the width of the main body portion 67, and in this example is closer to the front edge 68 than the rear edge 70.

When the cover 28 is inserted into the vent 20, the top surface 74 contacts a bottom of the rear glass panel 44 adjacent point 80, and the bottom surface 72 contacts a top of the body panel 62 adjacent point 80. This arrangement establishes an interference fit that keeps the cover 28 in place relative to the vent 20, and establishes a seal preventing ingress of fluid into the vent 20, while the motor vehicle 10 is washed.

To facilitate removal of the cover 28, the cover 28 includes tabs 84 projecting upward of the top surface 74. The cover 28 includes two such tabs adjacent ends of the cover 28. A user can grasp the tabs 84 and pull rearwardly to relatively easily remove the cover 28 from the vent 20. Structures other than tabs 84 come within the scope of this disclosure.

It should be understood that directional terms such as "top," "bottom," "forward," "rearward," etc., are used for purposes of explanation and should not otherwise be deemed limiting. Terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly, comprising:

a cover configured to fit relative to a vent of a motor vehicle, wherein the vent includes a plurality of openings spaced-apart by projections, and wherein the openings and projections of the vent are circumscribed by a perimeter gap, wherein the perimeter gap is present between the vent and an adjacent rear glass panel of the vehicle and is further present between the vent and an adjacent body panel of the vehicle arranged on an opposite side of the vent as the rear glass panel, wherein each of the openings is able to communicate fluid to an engine of the motor vehicle, wherein the cover is configured to prevent fluid from entering each of the openings, wherein the cover includes a perimeter, wherein the perimeter includes an edge having a flared bottom portion, wherein the flared bottom portion projects gradually further outward from a remainder of the edge until the flared bottom portion reaches a free end of the edge, and wherein the free end of the edge is a bottom-most point of the edge relative to when the cover is fit relative to the opening, wherein the cover is formed as a single, integrated body without any joints or seams, and wherein the cover is formed entirely of a rubber material, and wherein the flared bottom portion projects into the perimeter gap.

2. The assembly as recited in claim 1, wherein the cover is formed without any holes that would communicate fluid from an outside location into the opening.

3. The assembly as recited in claim 1, wherein the cover is formed using a molding technique.

4. The assembly as recited in claim 1, wherein:

the cover is a first cover and the opening is a first opening, the assembly further comprises a second cover configured to fit relative to a second opening of the motor vehicle, and the second opening is able to communicate fluid to the engine of the motor vehicle.

5. The assembly as recited in claim 4, further comprising:

a third cover configured to fit relative to a third opening of the motor vehicle, wherein the third opening is able to communicate fluid to the engine of the motor vehicle.

6. The assembly as recited in claim 5, wherein:

the second cover and the third cover are configured to fit relative to the second opening and the third opening, respectively, by movement in a vertical direction, and the first cover is configured to fit relative to the first opening by movement in a direction toward a front of the motor vehicle.

7. The assembly as recited in claim 5, wherein the motor vehicle is a mid-engine vehicle.

8. The assembly as recited in claim 1, wherein, within the perimeter gap, a first portion of the flared bottom portion directly contacts the rear glass panel and a second portion of the flared bottom portion on an opposite side of the cover as the first portion directly contacts the body panel.

9. The assembly as recited in claim 1, wherein:

the perimeter gap continuously circumscribes an entirety of the vent, the flared bottom portion continuously circumscribes an entirety of the cover, and the flared bottom is at least partially within the perimeter gap at every location about an entirety of the perimeter gap.

10. An assembly, comprising:

a cover configured to fit relative to an opening of a motor vehicle, wherein the opening is adjacent a rear edge of a rear glass panel and is further adjacent a body panel of the motor vehicle generally vertically below the rear edge of the rear glass panel, wherein the opening is able to communicate fluid to an engine of the motor vehicle, wherein the cover is configured to prevent fluid from entering the opening, wherein the cover includes a main body, wherein the main body includes a top surface and a bottom surface, wherein the main body exhibits a variable height between a front edge and a rear edge of the main body, wherein the height of the main body is at a maximum at a non-central point along a width of the main body between the front edge and the rear edge, wherein the height of the main body gradually and continuously increases moving along the width of the main body from the rear edge to the non-central point, wherein the height of the main body gradually and continuously decreases moving along the width of the main body from the non-central point to the front edge, wherein the cover is formed of a rubber material, and wherein, when the cover is fit relative to the opening, the main body is compressed between the rear glass panel and the body panel such that the rear glass panel and the body panel apply opposing forces on the top surface and the bottom surface, respectively, of the main body adjacent the non-central point, so as to establish an interference fit that holds the cover in place relative to the opening and so as to establish a seal preventing ingress of fluid into the opening.

11. The assembly as recited in claim 10, wherein the cover includes a tab projecting from the main body.

12. The assembly as recited in claim 11, wherein the tab is integrally formed with the main body.

13. The assembly as recited in claim 12, wherein the cover is entirely formed of a rubber material.

14. The assembly as recited in claim 10, wherein the cover includes a first tab projecting generally upwardly from a location adjacent a first side of the main body, and the cover further includes a second tab projecting generally upwardly from a location adjacent a second side of the main body opposite the first side.

15. The assembly as recited in claim 10, wherein the cover is formed entirely of a rubber material.

16. The assembly as recited in claim 10, wherein the non-central point is closer to the front edge than to the rear edge.

17. A method, comprising:

covering an opening of a motor vehicle with a cover before washing the motor vehicle by inserting the cover into the opening in a forward direction substantially parallel to a centerline of the motor vehicle, wherein the opening is adjacent a rear edge of a rear glass panel and is further adjacent a body panel of the motor vehicle generally vertically below the rear edge of the rear glass panel, wherein the opening is able to communicate fluid into an engine of the motor vehicle, and wherein the cover is configured to prevent fluid from entering the opening from an outside location, wherein the cover includes a main body, wherein the main body includes a top surface and a bottom surface, wherein the main body exhibits a variable height between a front edge and a rear edge of the main body, wherein the height of the main body is at a maximum at a non-central point along a width of the main body between the front edge and the rear edge, wherein the height of the main body gradually and continuously increases moving along the width of the main body from the rear edge to the non-central point, wherein the height of the main body gradually and continuously decreases moving along the width of the main body from the non-central point to the front edge, and wherein the cover is formed of a rubber material, wherein the cover includes a first tab projecting generally upwardly from a location adjacent a first side of the main body, and the cover further includes a second tab projecting generally upwardly from a location adjacent a second side of the main body opposite the first side, and wherein, when the cover is inserted into the opening, the main body is compressed between the rear glass panel and the body panel such that the rear glass panel and the body panel apply opposing forces on the top surface and the bottom surface, respectively, of the main body adjacent the non-central point, so as to establish an interference fit that holds the cover in place relative to the opening and so as to establish a seal preventing ingress of fluid into the opening.

18. The method as recited in claim 17, further comprising:

washing the motor vehicle after covering the opening of the motor vehicle with the cover.

19. The method as recited in claim 17, wherein the opening is a first opening and the cover is a first cover, and wherein the method further comprises:

covering a second opening of the motor vehicle with a second cover, wherein the second opening is able to communicate fluid to the engine;

covering a third opening of the motor vehicle with a third cover, wherein the third opening is able to communicate fluid to the engine; and wherein covering the second and third openings includes moving the second and third covers in a substantially vertical direction.

20. The method as recited in claim 17, wherein the non-central point is closer to the front edge than to the rear edge.

* * * * *